United States Patent [19]
Griffin et al.

[11] Patent Number: 5,851,575
[45] Date of Patent: Dec. 22, 1998

[54] METHOD FOR DRYING AND PROCESSING RAW FOOD MATERIAL

[75] Inventors: Dennis B. Griffin, Erlanger; John L. Crowley, Alexandria, both of Ky.

[73] Assignee: Griffin Industries, Inc., Cold Springs, Ky.

[21] Appl. No.: 841,230

[22] Filed: Apr. 29, 1997

[51] Int. Cl.$^6$ ........................................................ A23B 4/03
[52] U.S. Cl. ........................... 426/471; 426/456; 426/464; 426/465; 426/469; 426/472; 426/473; 426/474; 426/478; 426/480; 426/495; 426/641
[58] Field of Search ...................... 426/456, 464, 426/465, 469, 471, 472, 473, 474, 478, 480, 495, 641

[56] References Cited

U.S. PATENT DOCUMENTS

| | | | |
|---|---|---|---|
| 2,590,303 | 3/1952 | Fladmark | 426/478 |
| 2,597,230 | 5/1952 | Davis, Jr. | 426/478 |
| 3,142,862 | 8/1964 | Guldman . | |
| 3,499,476 | 3/1970 | Hartlapp et al. . | |
| 3,621,902 | 11/1971 | Okada et al. . | |
| 3,759,716 | 9/1973 | Schulman et al. | 426/478 |
| 4,187,617 | 2/1980 | Becker, Jr. et al. . | |
| 4,344,976 | 8/1982 | Bladh | 426/478 |
| 4,421,594 | 12/1983 | Bildjukevich et al. . | |
| 4,571,311 | 2/1986 | Ferguson, Jr. et al. . | |
| 4,702,799 | 10/1987 | Tuot . | |
| 5,064,501 | 11/1991 | Boersen . | |
| 5,113,755 | 5/1992 | Anderson et al. | 99/483 |
| 5,227,018 | 7/1993 | Bro et al. . | |
| 5,480,226 | 1/1996 | Milstead . | |
| 5,515,620 | 5/1996 | Butler . | |
| 5,528,838 | 6/1996 | Timm et al. . | |
| 5,555,639 | 9/1996 | Livingston et al. . | |
| 5,581,902 | 12/1996 | Didion et al. . | |

*Primary Examiner*—Helen Pratt
*Attorney, Agent, or Firm*—King & Schickli

[57] ABSTRACT

A combined spray and rotary drying apparatus includes a spray dryer having a housing defining a spray drying chamber, an annular inlet and an outlet. A burner and atomizer sprayer are provided in the spray drying chamber. The outlet of the spray drying chamber feeds into a rotary drying drum. A raw material feed chute is also provided for feeding raw material of relatively low moisture content directly to the rotary dryer. Methods of drying a raw material and of processing raw animal parts are also disclosed.

8 Claims, 7 Drawing Sheets

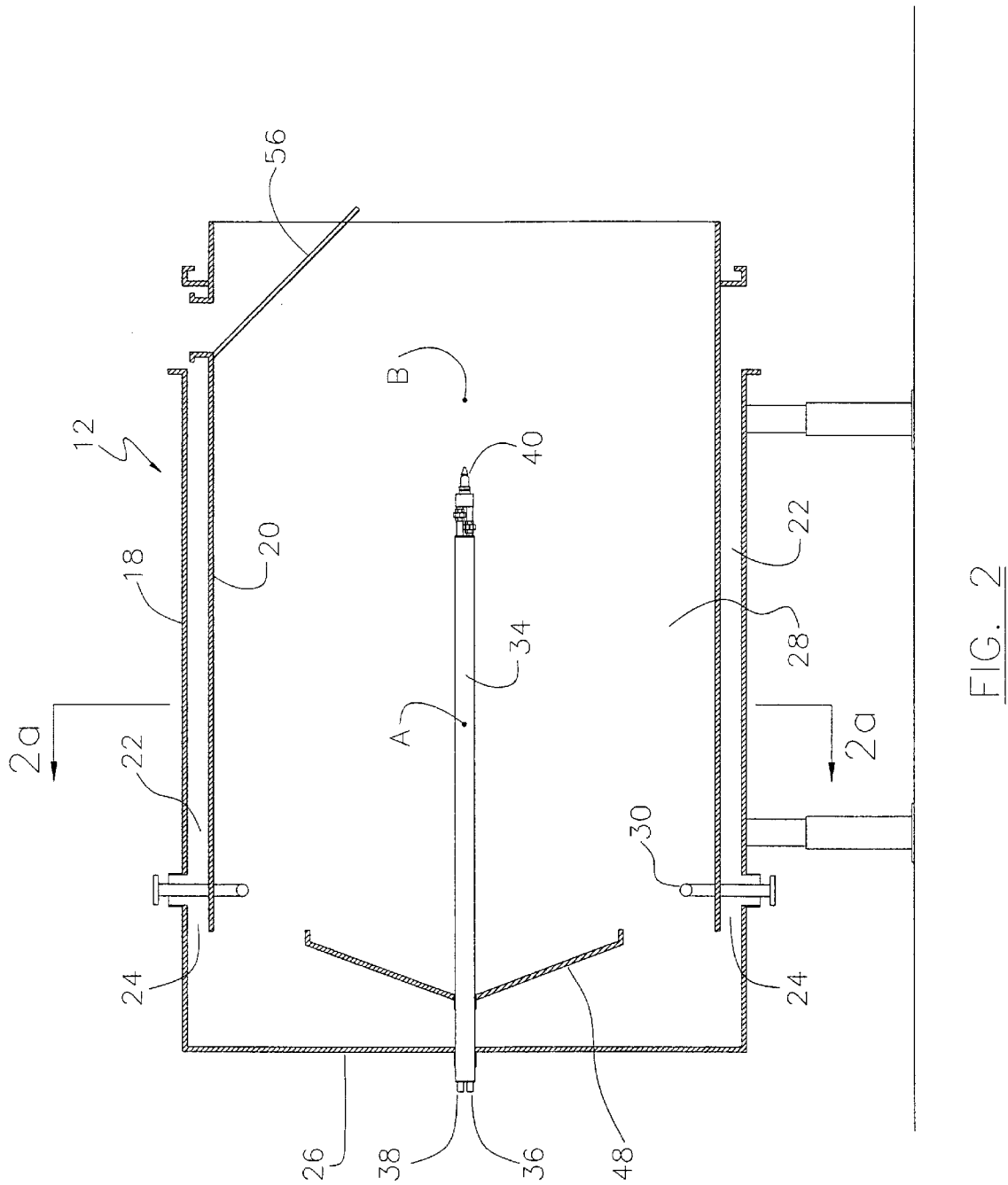

METHOD FOR DRYING AND PROCESSING RAW FOOD MATERIAL

TECHNICAL FIELD

The present invention relates generally to the nutritional supplement processing field and, more particularly, to a method of processing raw animal parts, a method of drying raw food material while preserving its nutritional content and an apparatus for spray drying that raw food material.

BACKGROUND OF THE INVENTION

Food additives are substances that may be added to foods during processing in order to improve desirable chemical or physical characteristics and food quality. One of the most important forms of food additives are nutritional supplements. These typically comprise minerals and vitamins that are added to foods in order to restore nutritional values lost during food processing or to supplement the natural content of the food nutrients. The importance of the use of nutritional supplements to enhance the health and growth of farm animals has long been recognized in the field of animal husbandry.

It has also long been recognized that the production of nutritional supplements from various by-products of food rendering operations is highly desirable. Specifically, by establishing a commercial use for these by-products, the economic viability of the food rendering process is enhanced and otherwise difficult waste material handling is reduced or altogether avoided. This is a particularly important aspect for the poultry rendering industry where significant amounts of waste materials are produced. Accordingly, various methods have been developed for the utilization and processing of feathers and offal as a nutritional supplement for food products. Such processes are generally disclosed in, for example, U.S. Pat. Nos. 3,272,632 to Speer and 4,269,865 to Retrum.

One of the primary drawbacks in the prior art processing of waste products such as feathers and offal into nutritional supplements has been the heat degradation of various amino acids and proteins that effectively eliminates these materials as a source of nutrition. Accordingly, a need is identified for an improved method of processing waste products such as feathers and offal so as to avoid heat degradation of important amino acids and proteins and thereby provide a supplement with enhanced nutritional values.

SUMMARY OF THE INVENTION

Accordingly, it is a primary object of the present invention to provide an economical and efficient method of processing raw animal parts into a supplement providing significantly enhanced nutritional values. Such a supplement may advantageously be utilized to promote the production of blood plasma in young animals and more particularly, farm animals such as piglets.

Yet another object of the present invention is to provide a method of drying raw food materials such as feathers and offal whereby the heat sensitive nutritional elements in those raw materials including amino acids and proteins are maintained in an undegraded and digestible state during and following drying to a desired moisture content.

Yet another object of the present invention is to provide an apparatus for more efficiently drying raw food materials.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an apparatus is provided for drying raw material such as waste products including feathers and offal being processed as a food supplement. The apparatus includes a spray dryer having a housing defining a spray drying chamber and an outlet. A burner is received in the spray dryer. Additionally, means are provided for atomizing and spraying the raw material into the apparatus. Further, a rotary drying drum is provided downstream from the spray dryer and includes an inlet in fluid communication with the outlet of the spray dryer. Accordingly, the raw material being dried is sequentially subjected to both spray drying and rotary drying in order to bring that material to a desired moisture content.

More specifically describing the invention, the housing includes an end cap opposite the outlet and spaced inner and outer walls defining an air feed passageway therebetween. The air feed passageway extends along the inner wall from adjacent the outlet to an annular delivery port adjacent the endcap. This provides for preheating of the air and cooling to the inner shell prior to delivery into the spray drying chamber.

Preferably, the burner received in the spray dryer is a ring burner and the atomizing spraying means includes a charging pipe and spray nozzle concentrically disposed so as to extend through the ring burner into the spray drying chamber. Further, a conical deflector is provided in the spray drying chamber. The deflector concentrically projects around the charging pipe and spray nozzle. This conical deflector deflects air from the annular delivery port outwardly toward the ring burner to provide even heating temperature and more consistent spray drying through the elimination of hot and cold spots.

Additionally, the apparatus includes a pressurized air source and a raw material feed source for delivering, respectively, air under pressure and raw material to the charging pipe and spray nozzle. The charging pipe includes a raw material feed tube received within an air jacket for the passage of the air under pressure. The air jacket effectively insulates the charging tube from direct heating by the ring burner and thereby insures that the raw material is not dried therein so as to clog the feed tube.

In accordance with another aspect of the present invention, a raw material feed chute is provided downstream from the charging pipe and the spray nozzle. This feed chute is utilized for delivering relatively lower moisture content raw material to the apparatus. Together, the spray dryer structure including the charging pipe for relatively high moisture content raw material and the feed chute for relatively low moisture content raw material function to insure that the raw material is evenly dried to a desired moisture content while simultaneously preserving the heat sensitive nutritional elements of the raw material (e.g. amino acids and proteins) from heat degradation which would otherwise reduce their nutritional value.

Still further describing the invention, a means is provided for driving the rotary drying drum. Further, the rotary drying drum includes a discharge outlet. Additionally, the apparatus further includes a collector in fluid communication with the discharge outlet of the rotary drying drum. This collector functions to collect the dried raw material of desired moisture content for purposes of further processing.

In accordance with another aspect of the present invention, a method is provided for drying raw material and, particularly, waste material such as hydrolyzed feathers and poultry offal being processed as a meal for food supplement. The method includes both the spray and rotary drying of the raw material having a first, relatively high moisture content. Further, the method includes the subjecting of raw material having a second relatively low moisture content directly to rotary drying with the raw material having the first, relatively high moisture content. Thus, the lower moisture content material is not subjected to spray drying. Accordingly, this lower moisture material is not subjected to higher heat levels that might otherwise lead to degradation of important heat sensitive amino acids and proteins. So as to insure that the raw material is processed and dried efficiently, the raw material is sprayed with pressurized air supplied at 60–85 and more preferably 75–80 psig. Further, an air stream velocity is maintained in the rotary drying drum of substantially 450–550 feet per minute.

Finally, in accordance with yet another aspect of the present invention, a method of processing raw animal parts is provided. That method includes the grinding of the raw animal parts to a size less than 0.25 inches. This is followed by the heating of the raw animal parts to provide a partial breakdown and the centrifuging of the raw animal parts to separate the partially processed raw animal parts into a meal, a water phase and an oil phase. Next is the subjecting of the water phase to spray drying and also subjecting the meal and spray dried water phase to rotary drying in order to recover any additional portion of meal in the water phase and to drive off the water by evaporation. This effectively eliminates any need to provide for separate waste water processing and, of course, is an environmentally friendly approach. Finally, the method includes the collecting of the meal at a desired moisture content for further processing.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a detailed cross-sectional view of the spray dryer section of the drying apparatus shown in FIG. 1;

Reference will now be made in detail to the present preferred embodiment of the invention, an example of which is illustrated in the accompanying drawing.

DETAILED DESCRIPTION OF THE INVENTION

Figure 1:
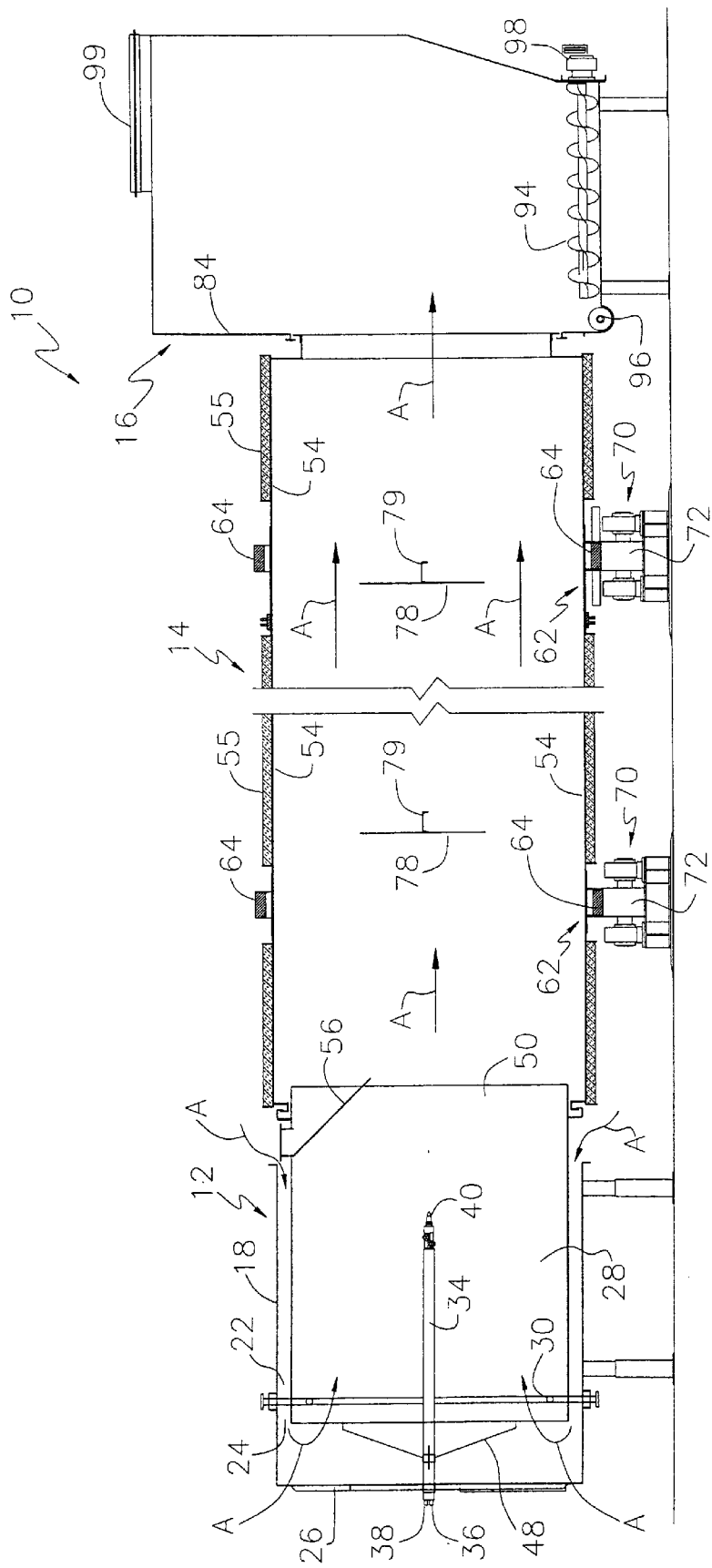
FIG. 1 is a partially sectional, partially schematic view of the apparatus of the present invention for the combined spray and rotary drying of raw material.

Reference is now made to FIGS. 1–6 showing the apparatus 10 of the present invention for drying raw material such as a nutrient supplement formed from hydrolyzed feathers, whole blood and poultry offal. As generally shown in FIG. 1, the apparatus 10 includes a spray dryer section 12, a rotary drying section 14 and a primary solid/meal collector section 16.

More specifically, the spray dryer section 12 includes a housing including an outer cylindrical wall 18 and an inner cylindrical wall 20. As shown, the inner cylindrical wall 20 is concentrically disposed and extends into the outer cylindrical wall 18 so that an annular air feed passageway 22 is defined therebetween. This air feed passageway 22 extends along the inner wall 20 to an annular delivery port 24 adjacent an endcap 26 that closes one end of the outer wall 18. Together, the outer wall 18, inner wall 20 and endcap 26 define a spray drying chamber 28 into which the air is fed through the annular delivery port 24.

Figure 2A:
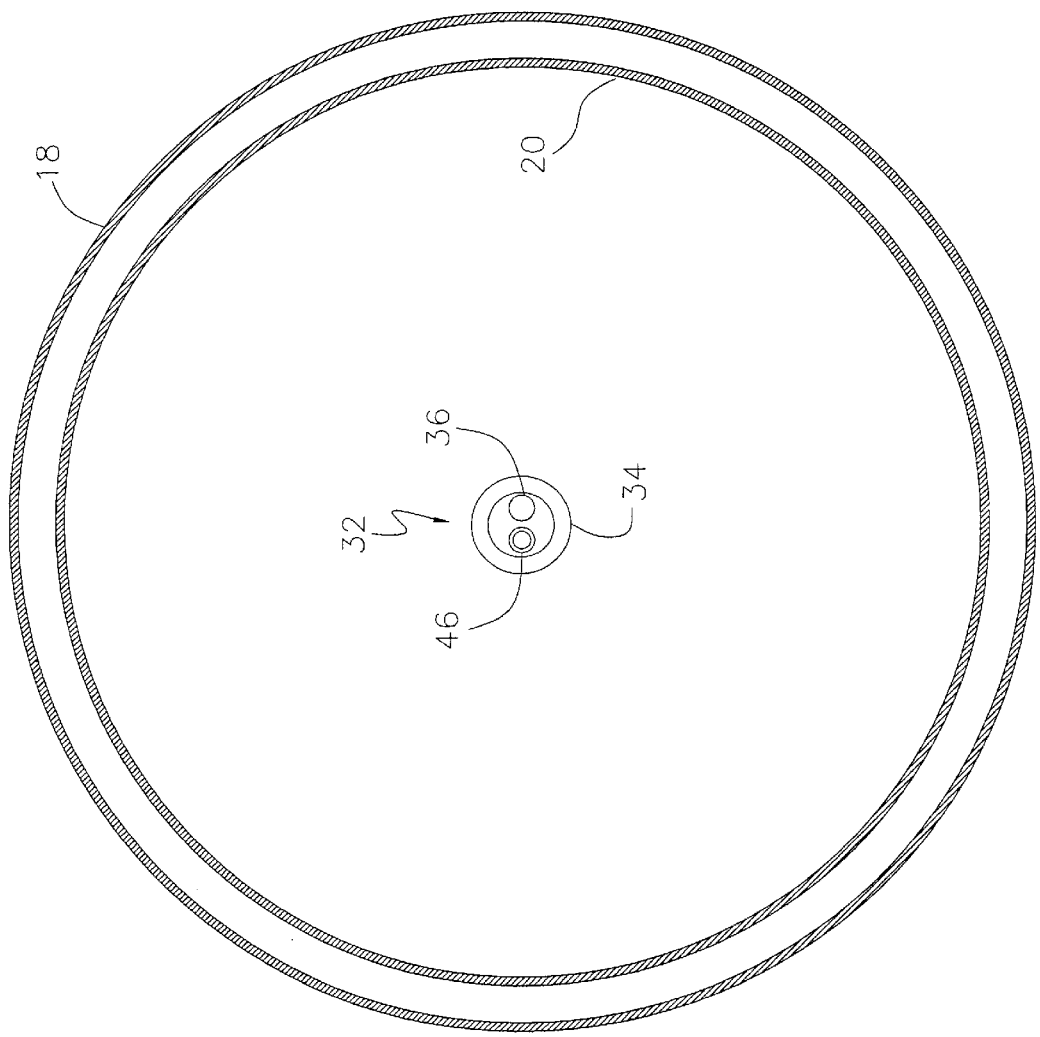
FIG. 2a is a detailed cross sectional view along line 2a2a of FIG. 2 showing the spray dryer section.

As further shown in FIG. 1 and with reference in detail to FIGS. 2 and 2a, a ring burner 30 is received in the spray drying chamber 28 so as to be concentrically disposed relative to the inner wall 20. Additionally, a raw material atomizing sprayer, generally designated by reference numeral 32 is mounted for relative sliding movement in the endcap 26. The atomizing sprayer 32 includes a charging pipe 34 having pressurized air and raw material feed inlets 36, 38 at its proximal end and a spray nozzle 40 at its distal end. As shown, the charging pipe 34 is concentrically disposed so as to extend within the ring burner 30 into the spray drying chamber 28. As further shown with reference also to FIG. 7, the pressurized air inlet 36 is connected to a pressurized air source 42 which provides or supplies air at substantially 60–85 and more preferably 75–80 psig. Similarly, the raw material inlet 38 is connected to a raw material feed source such as a storage tank 44 containing the raw material to be processed. Specifically, raw material from the storage tank 44 is received at the inlet 38 and passes through a feed tube 46 to the nozzle 40. The pressurized air from the pressurized air source 42 is received at the pressurized air inlet 36 and travels through the charging pipe 34 which functions as an air jacket around the feed tube 46 (see also FIG. 2a) thereby protecting the raw material in the feed tube from the high temperatures in the dryer produced by the ring burner 30. Accordingly, no drying of the raw material occurs in the feed tube 46 and free flow of the raw material through that tube is assured. Further, the air in the charging pipe/jacket 34 is preheated so that no moisture is added to the raw material being dried.

Since the atomizing sprayer 32 may be moved/slid into and out of the end cap 26, it should be appreciated that the distance the nozzle 40 projects into the spray drying chamber 28 may be adjusted. Thus, more rapid drying may be provided by positioning the nozzle at, for example, point A (see FIG. 2). In this position the raw material is sprayed from the nozzle 40 adjacent to the ring burner 30 where it is subjected to higher drying temperatures. Alternatively, the nozzle 40 may be positioned at, for example point B (again see FIG. 2). In this position the raw material is sprayed from the nozzle 40 further downstream from the ring burner 30. Thus, there is a less direct application of heat and the raw material is subjected to lower drying temperatures. The position of the nozzle 40 relative to the burner ring 30 may be adjusted to meet the needs of the particular application.

As also shown in FIGS. 1 and 2, a conical deflector 48 is carried by and concentrically projects around the charging pipe 34. This conical deflector 48 serves to deflect air from the annular delivery port 24 outwardly toward the ring burner 30. This advantageously insures even heating of the air thereby enhancing dryer performance by substantially eliminating any hot spots or cold spots which might otherwise lead to inconsistent drying of product.

As further shown in FIGS. 1 and 2, the inner wall 20 of the spray dryer section 12 defines an outlet 50. This outlet 50 directly communicates with the drying chamber 52 defined by the rotary drum 54 of the rotary drying section 14. Additionally, a raw material feed chute 56 is provided in the inner wall 20 of the spray dryer section 12 downstream from the charging pipe 34 and spray nozzle 40. It should be appreciated that relatively lower moisture content raw material is delivered through this feed chute 56 so that it is not as directly subjected to the heat from the ring burner 30. This functions to protect the temperature sensitive elements including amino acids and proteins of the raw material in this lower moisture content material from heat degradation that would otherwise adversely affect the nutritional value of the subsequent meal product.

Figure 5:
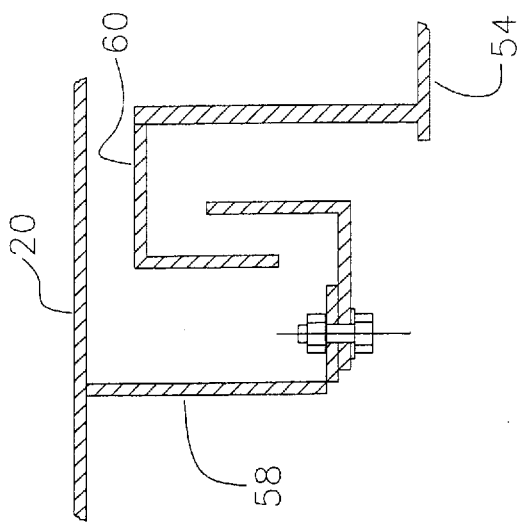
FIG. 5 is a detailed view showing the seal detail between the spray dryer section and the rotary drying drum section.

The seal between the spray dryer section 12 and the rotary dryer section 14 is best shown in FIG. 5. Specifically, the stationary inner wall 20 of the housing of the spray dryer section 12 includes an outwardly projecting, substantially u-shaped sealing flange 58. The rotary drum 54 of the rotary drying section 14 includes an inwardly extending, substantially n-shaped flange 60 that freely meshes with the cooperating substantially u-shaped flange 58 carried on inner wall 20. Together, the substantially u-shaped flange 58 and substantially n-shaped flange 60 provide a baffle-like seal which minimizes air flow losses as the air travels from the spray dryer section 12 to the rotary drying section 14.

The rotary drying section 14 is of a design generally well known in the art. Specifically, the rotary drum 54 including a heat insulating shroud 55 incorporates at least two tire assemblies 62. Each tire assembly 62 includes a tire 64 mounted by means of shims 68 on a band 66 secured to the drum 54. Each tire assembly 62 rides in a track assembly generally designated by reference number 70. Each track assembly 70 extends along an arc of substantially 120°–180° and includes a series of aligned trunnion rollers 72 that receive a tire 64 and serve to support the weight of the rotary drum 54. Thrust rollers 73 maintain the tires 64 in alignment with the trunnion rollers 72. A motor 74 is provided to drive the rotary drum 54 through means of a chain 75 that engages a sprocket 76 mounted to the drum.

Figure 3:
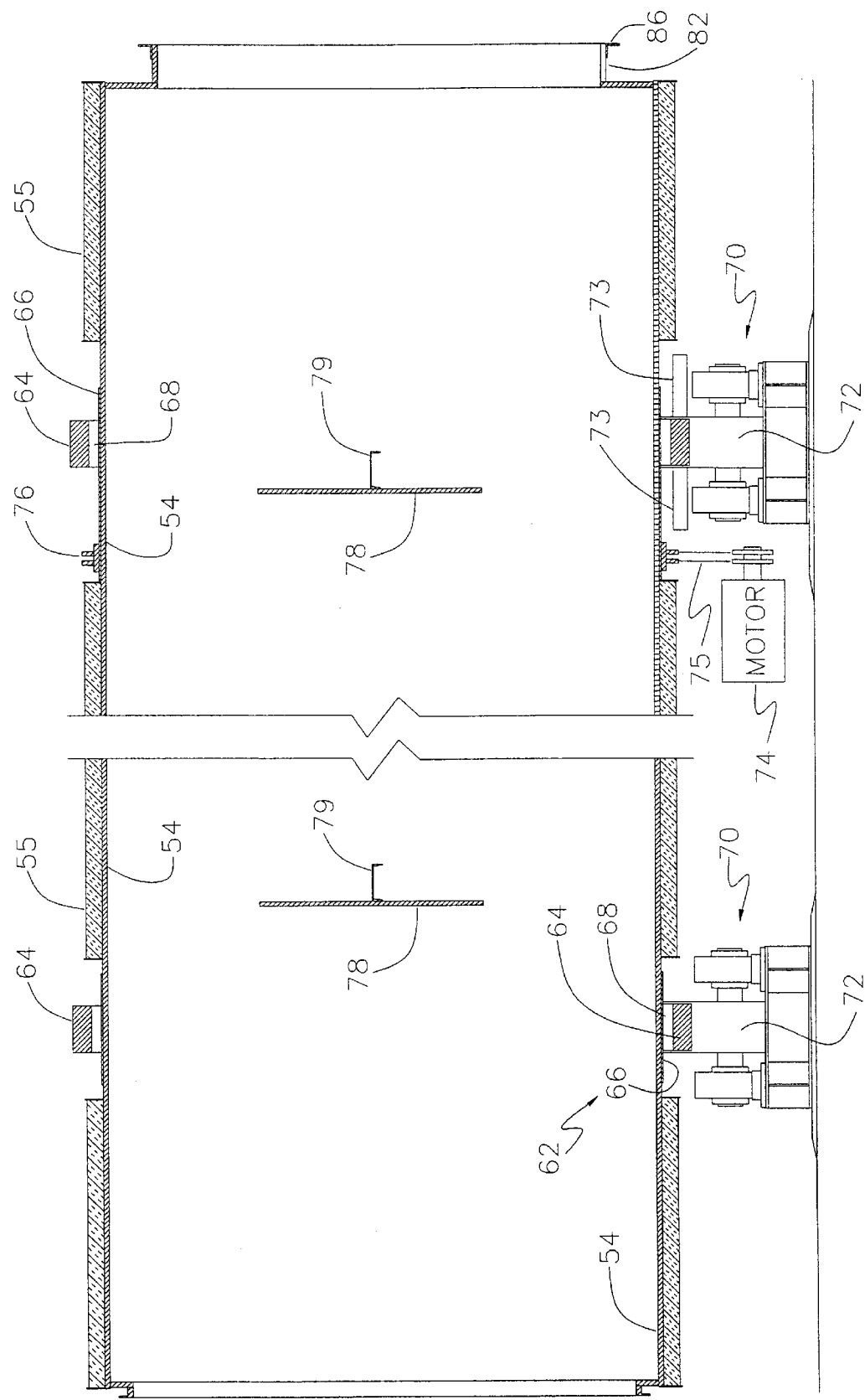
FIG. 3 is a cross-sectional view of the rotary drying drum section of the apparatus shown in FIG. 1.
Figure 4:
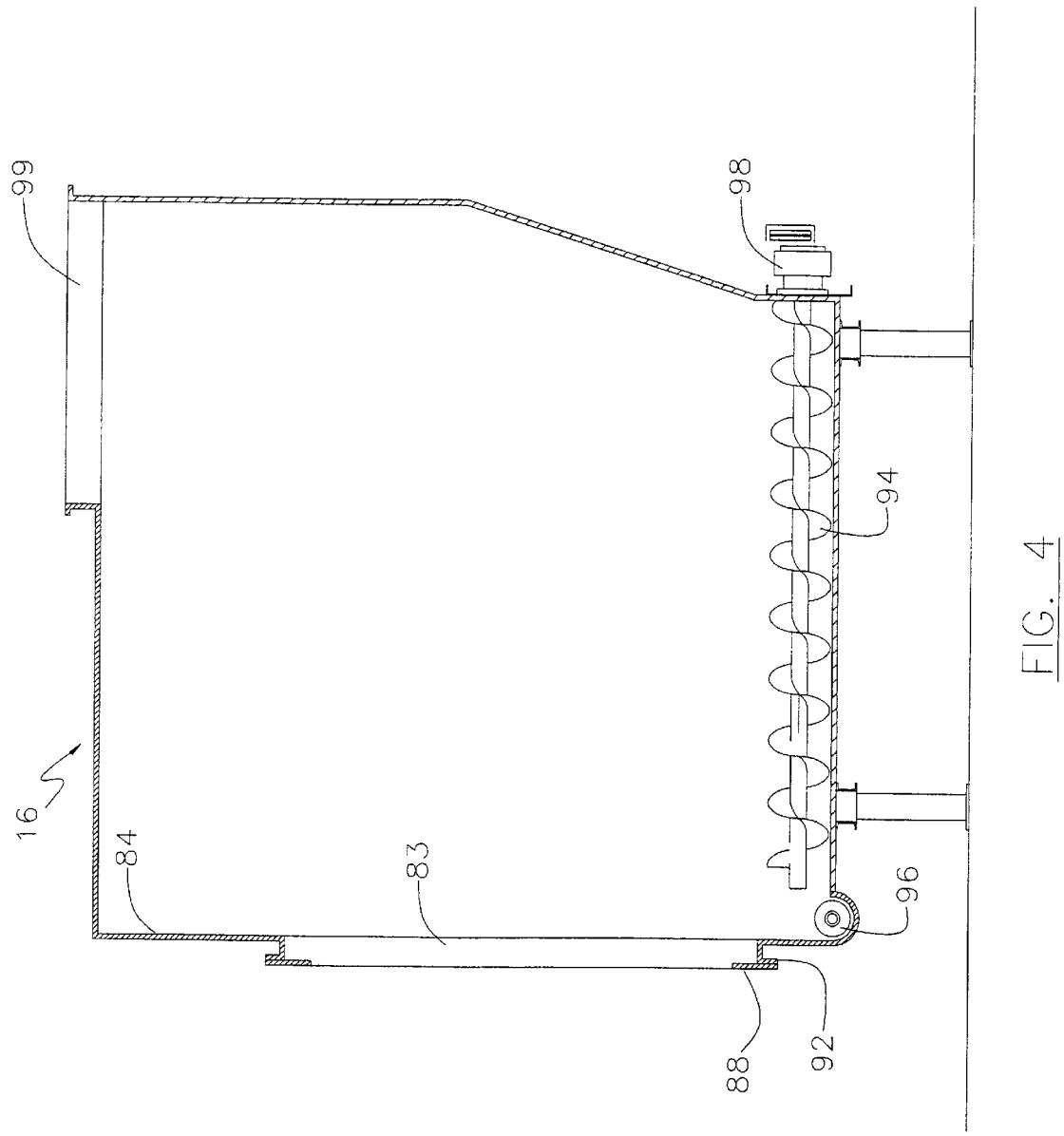
FIG. 4 is a cross-sectional view of the primary solids or meal collector section of the drying apparatus of FIG. 1.

As further shown in FIG. 3, the rotary drying drum 54 includes a series of targets or plates 78 supported by mounting brackets 79 so as to be disposed concentrically within the center of the drum 54. These function to divert the air flowing through the rotary drum 54 and, therefore, the raw material being dried and conveyed by that air toward the sidewall of the dryer drum. This functions to enhance the drying action in a manner known in the art.

Figure 6:
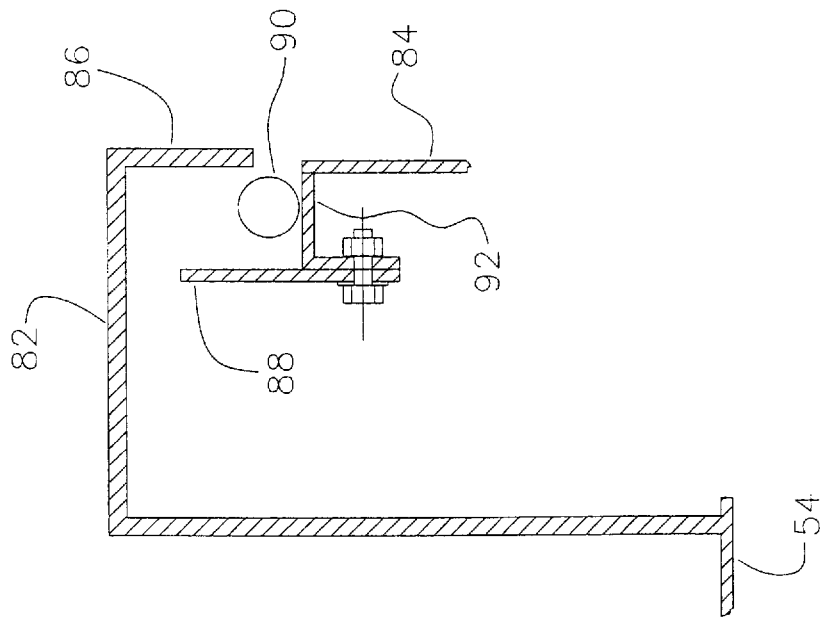
FIG. 6 is a detailed cross-sectional view showing the seal detailed between the rotary drying drum section and the meal collector section.

The outlet 82 of the drying drum is connected in fluid communication with the inlet 83 to the housing 84 defining the primary solid/meal collector 16. The seal formed between the rotary drum 54 and the collector housing 84 is best shown in detail in FIG. 6. As shown, the rotary drum 54 includes an outwardly projecting flange 86 and the collector housing 84 includes an outwardly projecting substantially T-shaped flange 88. Boiler rope packing 90 is provided on the leg 92 of the T-shaped flange 88 as shown in FIG. 6. This arrangement guards against contamination with cooler atmospheric air and insures best possible dryer efficiency.

The primary solids/meal collector 16 also includes a pair of discharge screws 94, 96. The first discharge screw 94 is longitudinally aligned with the rotary drum 54 of the rotary drying section 14. This discharge screw 94 is driven by a motor 98 and feeds dry raw material to the second, partially underlying discharge screw 96. The second discharge screw 96 is driven by a motor (not shown) and delivers the dried raw material to a discharge chute (not shown) for further processing. An upper discharge duct 99 directs the air stream from the solids/meal collector 16 to a cyclone 114 in accordance with a further description of the processing method set forth below (see also FIG. 7).

The use of the drying apparatus 10 of the present invention will now be described in detail in conjunction with a method of drying raw material and a method of processing raw animal parts.

Figure 7:
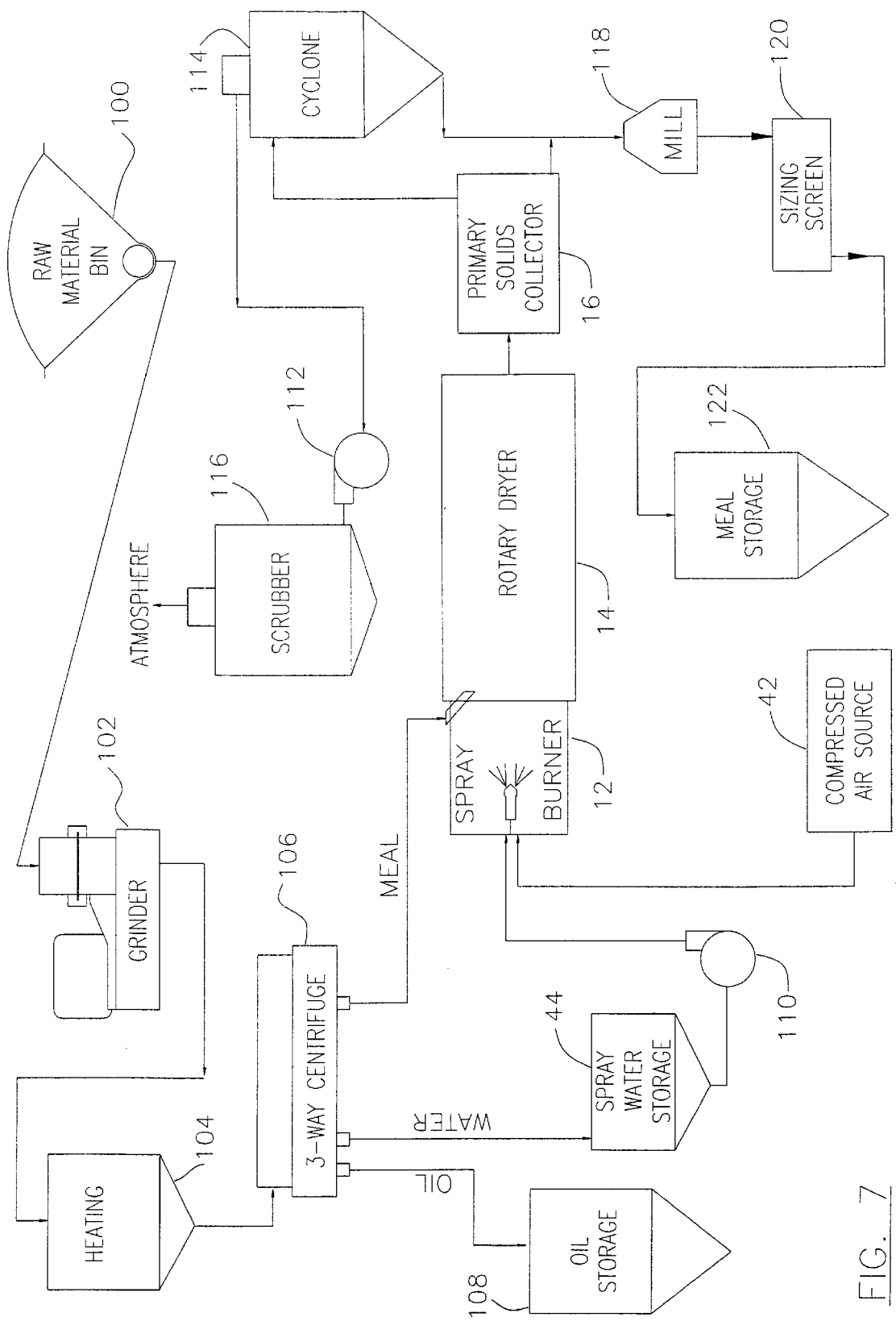
FIG. 7 is a schematical block diagram showing the method of the present invention for processing raw animal parts.

In accordance with the methods and as illustrated in FIG. 7, raw material of poultry offal is fed from a bin 100 and delivered to a grinder 102 where it is ground to the desired size and consistency (e.g. no pieces greater than ¼ inches in diameter). Following grinding, the raw material is fed from the grinder 102 to a heating unit 104. There the product is heated to between 195°–205° F. in order to partially break down the raw material into meal, a water phase and an oil phase. These three phases are then delivered to a three way centrifuge 106 where the oil is separated and delivered to oil storage vessel 108. Simultaneously, the water phase is delivered to a spray water storage tank 44.

From there, the water phase is delivered by means of pump 110 to the raw material inlet 38 of charging pipe 34. Compressed air from the source 42 is delivered to the pressurized air inlet 36 of the same charging pipe 34 and the air and raw material are sprayed together through the nozzle 40 in a full cone spray pattern into the spray drying chamber 28 of the spray dryer section 12. The burner ring 30 incorporates inwardly directed gas jets that direct the flames toward the nozzle 40. As a result of the spray pattern and inwardly directed jets, the raw material is quickly dried so as to avoid any sticking to the walls of the apparatus during the drying process. Simultaneously, meal from the three way centrifuge 106 is delivered to the feed chute 56 for delivery into the rotary dryer 14 of the drying apparatus 10 as also described in greater detail above.

As a result of this arrangement, it should be appreciated that the water phase is subjected to spray drying in the spray dryer section 12 and then rotary drying in the rotary drying section 14 while the meal is only subjected to rotary drying in the rotary drying section. Hence, the higher moisture content water phase is subjected to higher temperatures and greater drying to drive off the water through evaporation and recover additional raw material for meal. Simultaneously, the relatively low moisture content meal is subjected to lower temperatures and less drying. Accordingly, any heat sensitive amino acids, proteins and other sources of nutrition contained therein are protected from heat degradation. Processed meal is then recovered in the primary solids/meal collector section 16.

In order to insure proper operation of the drying apparatus, the pressurized air from the compressed air source 42 is supplied at substantially 60–85 psig and more preferably 75–80 psig. Simultaneously, an induced draft fan 112 is provided downstream to insure that an air stream velocity of substantially 450–550 feet per minute is maintained through the spray dryer section 12 and the rotary drying drum 54 (note Action Arrows A in FIG. 1). It is this air stream that entrains the spray dried raw material and conveys the same from the spray dryer section 12 to the rotary drying drum 54 where the spray dried raw material mixes with the meal during rotary drying. This air stream also carries the mixed and dried raw material through the rotary drying drum 54 to the primary solids collector 16. A cyclone 114 and scrubber 116 clean the air before it is exhausted into the environment. Meal recovered in the primary solids collector 16 and cyclone 114 is then delivered to a mill 118. From the mill 118, the meal is subjected to sizing by means of a screen 120 and then delivered to a storage bin 122 to await further processing or shipment. Following processing the meal has a moisture content preferably of between 5–8%.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of drying raw material in a drying apparatus including a spray dryer section and a rotary drying section in fluid communication, said method comprising:

maintaining an air stream running through said spray dryer section and downstream through said rotary drying section;

spray drying said raw material having a first relatively high moisture content;

conveying said spray dried raw material having a first relatively high moisture content in said air stream to said rotary drying section; and rotary drying said spray dried raw material having a first relatively high moisture content.

2. The method set forth in claim 1, further including delivering raw material having a second relatively low moisture content to said rotary drying section to undergo rotary drying with said spray dried raw material having a first relatively high moisture content.

3. The method set forth in claim 2, further including adding said spray dried raw material having a first relatively high moisture content to said raw material having a second relatively low moisture content in said rotary drying section.

4. The method set forth in claim 1, further including spray drying with pressurized air supplied at 60–80 psig.

5. The method set forth in claim 1, further including maintaining an air stream velocity of 450–550 feet/minute.

6. A method of processing raw animal parts, comprising:

grinding said raw animal parts;

heating said raw animal parts;

separating said ground and heated raw animal parts into a meal, a water phase and an oil phase;

spray drying said water phase;

entraining said spray dried water phase in an air stream and delivering said spray dried water phase to a rotary dryer;

adding said spray dried water phase to said meal in said rotary dryer and rotary drying said spray dried water phase and meal together; and collecting said mixed water phase and meal at a desired moisture content for further processing.

7. The method set forth in claim 6, further including spray drying with pressurized air supplied at 60–80 psig.

8. The method set forth in claim 6, further including maintaining an air stream velocity of 450–550 feet/minute.

* * * * *